United States Patent Office 2,848,339
Patented Aug. 19, 1958

2,848,339

METHOD OF PREPARING GLASS COLOR COMPOSITIONS

Christian C. Jessen, Perth Amboy, N. J., assignor to E. I. du Pont de Nemours and Company, Wilmington, Del., a corporation of Delaware No Drawing. Application July 13, 1955
Serial No. 521,909

4 Claims. (Cl. 106—48)

This invention relates to a method of preparing glass color compositions, and more particularly it relates to a method of preparing glass color compositions composed of glass colors mixed with vehicles which are solid at room temperature but melt readily at a temperature slightly above room temperature.

There have recently been developed ceramic color compositions for use in glass decoration that are solid at temperatures below about 120° F. to 212° F. but which melt readily above such temperatures. Such color compositions have particular use in producing multi-color prints by screen stencil application. The compositions are comprised of glass colors, i. e., inorganic pigments mixed with finely ground glass and the aforesaid normally solid vehicles, for examples, waxes, wax-like materials, thermoplastic resins, high-boiling solvents, and the like, or various combinations of such materials.

Such glass color compositions have universally been prepared by melting the vehicle ingredients and mixing the same in the molten state, after which cold glass colors from storage stock are mixed in with the vehicle while maintaining the mass in the molten state. Frequently, the mixed vehicle was first solidified and then remelted and mixed with the glass colors. This latter method was adopted to permit the use of freshly mixed glass color compositions, it being found that such compositions, upon aging, did not melt as sharply as desired but had a tendency to gel rather than melt sharply.

It has been found that such previously known operations cause some degradation of vehicle ingredients, cause the glass color compositions to lose their sharp melting character, and involve a costly operation, especially when employed with relatively small batches, as required.

It is an object of this invention to provide a method of preparing glass color compositions employing normally solid vehicles which will overcome the above-mentioned disadvantages.

It is another object of this invention to provide a method of preparing glass color compositions employing normally solid vehicles, which compositions have greatly enhanced maintenance of sharp melting characteristics upon aging.

Other objects of the invention will appear hereinafter.

The objects of this invention may be accomplished by heating the glass colors to a temperature of at least 450° F. and maintaining the same in a moisture-free state until they are mixed with the hot-melt vehicle ingredients.

The heating of the glass colors may be carried out in any desired manner, for example, in a crucible or other container in a furnace or lehr. The heating must be carried out at a temperature of at least 450° F.; however, any higher temperature below the softening point of the glass color ingredients may be employed. The period of heating will depend upon the temperature employed. At a temperature of around 500° F. to 600° F. it is preferred to carry out such heating for a period of at least one hour. Longer periods, i. e., period of twenty-four to one hundred and fifty hours, are preferred. In general, the longer such heating is carried out the greater will be the stability of the sharp melting character of the glass composition upon aging.

The glass colors may be composed of any ingredients such as are generally used in the preparation of glass color compositions. Glass colors are usually composed of 5% to 20% of inorganic oxide pigments of the desired hue or color and 95% to 80% of glass frits such as borosilicate or lead-borosilicate frits.

The heated glass colors may be cooled before mixing with the vehicle ingredients. Care must be taken, however, to maintain the glass colors substantially moisture-free. Preferably, the glass colors are allowed to cool to a temperature of between 300° F. and 400° F. before the vehicle ingredients are added thereto.

The vehicle ingredients may be composed of any materials conventionally used in the preparation of the so-called "hot-melt" vehicle compositions, i. e., compositions solid at room temperature but sharply melting at somewhat elevated temperatures, e. g., temperatures of 120° F. to 212° F. Such vehicle compositions are described in United States Letters Patent Nos. 2,607,701 and 2,607,702, issued August 19, 1952, to Christian C. Jessen, and 2,682,480, issued June 29, 1954, to Ray Andrews, and may contain one or more of the following: waxes or wax-like materials, such as palmitic acid, stearic acid, solid soaps, carnauba wax, paraffin wax, microcrystalline wax, spermaceti, and beeswax, as well as various artificially prepared waxes; thermoplastic resins, such as rosin, hydrogenated rosin, zinc-hardened rosin, rosin esters, isomerized synthetic rubber, alkyd resins, butyl methacrylate resin, and the like; high-boiling solvents such as liquid esters of rosin, hydrogenated methyl ester of rosin, high-boiling petroleum solvents, and the like; and modifying agents such as phosphorated tall oil, stearyl acid phosphate, and lecithin.

Generally, it is desirable to rely solely upon the heat in the glass colors to supply the necessary heat for melting of the vehicle and mixing the ingredients of the glass color compositions. It is permissible, however, to supply all, or additional, heat for this purpose, if desired, it being imperative and critical, however, that the glass colors be first heated to at least 450° F. for a period of at least one hour and that such heated glass colors be maintained substantially free of moisture before mixing with the vehicle components.

If the glass colors are allowed to cool to approximately room temperature, they should be maintained out of contact with the atmosphere to avoid condensation of moisture thereon. This may be done by cooling within the closed furnace in which they are heated. The glass colors must, in any event, be cooled to 300° F. to 400° F. to avoid possible degradation of vehicle constituents.

The vehicle components may be added to the glass color as individual, separate materials, or as a premixed batch.

After the mass has been thoroughly mixed while molten, it is allowed to partially cool, e. g., to a temperature of 150° F. to 250° F., and the resulting mass preferably further mixed by milling, for example, in a rolling mill, and finally cooled to room temperature and broken up, for example, on a roll type flaker.

The preferred method of carrying out the process of this invention is illustrated by the following specific embodiment, in which parts are by weight:

*Example*

A finely ground mixture of 300 to 500 parts of borosilicate glass frit and inorganic oxide pigment is heated at 500–600° F. for at least one hour in a crucible within a closed furnace. This heated glass color is cooled to 300–400° F. and mixed, in the hot, moisture-free condition, with the components of the hot melt vehicle disclosed in Example I of my previously mentioned U. S. Patent No. 2,607,702, which are as follows:

|  | Parts |
|---|---|
| "Staybelite" resin (hydrogenated rosin) | 27.1 |
| "Poly-pale" resin | 20.1 |
| Stearic acid | 47.3 |
| Ethyl cellulose | 0.5 |
| Commercial stearyl acid phosphate | 5.0 |
| Total | 100.0 |

The stearyl acid phosphate is preferably added last after the mass has partially cooled, and further mixing is conducted at a temperature of 150–250° F. by milling in a rolling mill. The mixture is finally cooled to room temperature and broken up on a roll type flaker.

Since it is obivous that many changes and modifications can be made in the above-described details without departing from the nature and spirit of the invention, it is to be understood that the invention is not to be limited to said details except as set forth in the appended claims.

I claim:

1. In the process for preparing a hot-melt glass color composition by mixing a finely ground glass color containing 5% to 20% of inorganic oxide pigments and 95% to 80% of glass frit with a molten hot-melt vehicle at a temperature below 300° F., said vehicle being a composition having sharp melting characteristics which is solid at room temperature and melts readily at temperatures of about 120° F. to 212° F., the improvement in said process for providing hot-melt glass color compositions having greatly enhanced maintenance of sharp melting characteristics upon aging which comprises heating said finely ground glass color at a temperature between 450° F. and the softening point of the glass color and cooling the glass color to a temperature below 400° F. prior to mixing the glass color with said vehicle, the glass color being maintained in a moisture-free state after heating until it is mixed with said vehicle.

2. In the process for preparing a hot-melt glass color composition by mixing a finely ground glass color containing 5% to 20% of inorganic oxide pigments and 95% to 80% of glass frit with a molten hot-melt vehicle at a temperature below 300° F., said vehicle being a composition having sharp melting characteristics which is solid at room temperature and melts readily at temperatures of about 120° F. to 212° F., the improvement in said process for providing hot-melt glass color compositions having greatly enhanced maintenance of sharp melting characteristics upon aging which comprises heating said finely ground glass color at a temperature between 450° F. and the softening point of the glass color, cooling the glass color to a temperature between 300° F. and 400° F., mixing the heated glass color with said vehicle, and cooling the resulting composition.

3. In the process for preparing a hot-melt glass color composition by mixing a finely ground glass color containing 5% to 20% of inorganic oxide pigments and 95% to 80% of glass frit with a molten hot-melt vehicle at a temperature below 300° F., said vehicle being a composition having sharp melting characteristics which is solid at room temperature and melts readily at temperatures of about 120° F. to 212° F., the improvement in said process for providing hot-melt glass color compositions having greatly enhanced maintenance of sharp melting characteristics upon aging which comprises heating said finely ground glass color at a temperature between 450° F. and the softening point of the glass color for a period of at least one hour, cooling the glass color to a temperature below 400° F. while maintaining the glass color in a moisture-free state, mixing the resulting glass color with said vehicle, cooling the composition, roll milling the composition, and breaking the composition into particles.

4. In the process for preparing a hot-melt glass color composition by mixing a finely ground glass color containing 5% to 20% of inorganic oxide pigments and 95% to 80% of glass frit with a molten hot-melt vehicle at a temperature below 300° F., said vehicle being a composition having sharp melting characteristics which is solid at room temperature and melts readily at temperatures of about 120° F. to 212° F., the improvement in said process for providing hot-melt glass color compositions having greatly enhanced maintenance of sharp melting characteristics upon aging which comprises heating said finely ground glass color at a temperature between 450° F. and the softening point of the glass color for a period of at least one hour, cooling the glass color to a temperature between 300° F. and 400° F., mixing the heated glass color with said vehicle, cooling the composition, roll milling the composition, and breaking the composition into particles.

References Cited in the file of this patent

UNITED STATES PATENTS

| 569,859 | Cotter | Oct. 20, 1896 |
| 743,051 | Amies | Nov. 3, 1903 |
| 929,813 | Amies | Aug. 3, 1909 |
| 1,671,070 | Forrester | May 27, 1928 |
| 2,361,376 | Athy et al. | Oct. 31, 1944 |
| 2,607,701 | Jessen | Aug. 19, 1952 |
| 2,607,702 | Jessen | Aug. 19, 1952 |
| 2,682,480 | Andrews | June 29, 1954 |